US005652804A

United States Patent [19]

Bronstein et al.

[11] Patent Number: 5,652,804

[45] Date of Patent: Jul. 29, 1997

[54] AUTOMATIC INSPECTION OF PRINTING PLATES OR CYLINDERS

[75] Inventors: Rafail Bronstein, Kfar Saba; Omer Karp, Kochav Yair; Michael Goldstein, Herzlia, all of Israel

[73] Assignees: Advanced Vision Technology, Ltd.; Scitex Corporation Ltd., Herzlia, Israel

[21] Appl. No.: 275,902

[22] Filed: Jul. 15, 1994

[30] Foreign Application Priority Data

Jul. 20, 1993 [IL] Israel ........................................ 106406

[51] Int. Cl.$^{6}$ ........................................ G06K 9/00

[52] U.S. Cl. ........................................ 382/141; 382/112

[58] Field of Search ........................................ 382/112, 113, 382/108, 100, 104, 229, 203, 309, 310, 311; 356/429, 430, 431, 237; 101/DIG. 45, DIG. 47

[56] References Cited

U.S. PATENT DOCUMENTS

| | | | |
|---|---|---|---|
| 4,649,566 | 3/1987 | Tsunoda et al. | 382/1 |
| 5,033,378 | 7/1991 | Ebihara | 101/152 |
| 5,131,053 | 7/1992 | Bernzott et al. | 382/9 |
| 5,163,368 | 11/1992 | Pensavecchia et al. | 101/136 |
| 5,296,935 | 3/1994 | Bresler | 358/406 |

FOREIGN PATENT DOCUMENTS

| | | |
|---|---|---|
| 0323537A1 | 7/1989 | European Pat. Off. . |
| 3940822A1 | 6/1991 | Germany . |
| 2012213 | 7/1979 | United Kingdom . |

OTHER PUBLICATIONS

*Digital Picture Processing*, Second Edition, vol. 2, Azriel Rosenfeld and Avinash C. Kak, Academic Press, Inc., Orlando, 1982, pp. 85–152.

*Computer Vision*, Dana H. Ballard and Christopher M. Brown, Prentice–Hall, Inc., Englewood Cliffs, 1982, pp. 76–194.

*Automated Visual Inspection*, B.G. Batchelor, D.A. Hill and D.C. Hodgson, IFS Publications, Ltd., UK, North Holland, 1985, secs. 4.4, 5.6, 10.6, 10.8.

*Primary Examiner*—Joseph Mancuso

*Assistant Examiner*—Gerard Del Rosso

*Attorney, Agent, or Firm*—Skjerven, Morrill, MacPherson, Franklin & Friel, LLP

[57] ABSTRACT

A method for inspecting a surface of a printing medium, the method comprising the steps of acquiring an image of the surface or a portion thereof, digitizing the acquired image whereby a digitized real representation of the surface or portion is obtained. The method also include the step of for each of said digitized real representation performing either or both of the steps of comparing said digitized real representation with a digital reference representation, said reference representation being a virtual digital fault-free representation of said surface or portion thereof and determining whether said real digitized representation is in compliance with stipulations of a set of rules which define the characteristics of a fault-free digital representation of said surface or portion, and providing either a correct indication output signal where there is a match between said real digitized representation with said reference digital representation in the case of the step of comparing or compliance with said rules in the case of said step of determining, or fault indication output signal where there is a mismatch in the case of the step of comparing or incompliance in the case of the case of determining.

15 Claims, 7 Drawing Sheets

AUTOMATIC INSPECTION OF PRINTING PLATES OR CYLINDERS

FIELD OF THE INVENTION

The present invention relates to a method and system for the inspection of a printing plate or cylinder, in order to automatically detect errors and defects which may influence the quality of the print.

BACKGROUND OF THE INVENTION

Books, magazines and other publications are typically produced by offset or gravure printing. In offset printing, a plate is imaged in a contact frame or by direct exposure to a laser beam. The plate is later mounted on a press and then impressed on the printed substrate. In gravure printing, a cylinder is engraved by laser exposure and subsequent chemical etching or by the use of a penetrating pyramid shaped diamond stylus in an apparatus known as a "helioklischograph"

The formation of the printing plate for offset printing or the cylinder for gravure printing, is error prone and very often defects occur. Such errors may arise from a number of sources. In offset printing the plates are routinely imaged in vacuum contact frames or Step and Repeat machines such as Impomaster™ (manufactured by Misomex AG, Hagerstrom, Sweden). In both cases the plate is placed on a surface in contact with a color separation film. A vacuum is applied to ensure uniform attachment and the absence of a gap between the film and the plate. If air pockets (or dust particles) remain between the film and the plate, the exposed image will have non-uniform areas. In addition, errors in plate exposure may be caused by scratches, dust and paper/cloth lint that remain on the film after cleaning.

After inspection of the plates, which was hitherto mainly visually performed, or performed with the aid of an inspection station such as that available from Just Normalicht, Newton, Pa., USA, scratches and pinholes on non-imaged areas may be deleted by a correcting pencil. However, errors in imaged areas and errors related to separation or imposition order cannot be corrected at all.

Gravure cylinders are typically engraved by the use of a pyramid shaped diamond stylus which is forced into the copper cylinder forming gravure cells. One source of defects in the manufacturing process of gravure cylinders is faults which occasionally occur in the stylus, e.g. a chopped tip, stylus rib defects and others which may be caused, for example, by stylus material fatigue, rib wearing, etc. In addition, abnormal gravure cells are formed at times by inaccuracies in the current which drives the stylus. An additional source of engraving errors is regional copper recrystallization on bare cylinders, particularly where the cylinders are stored for long periods of time (i.e., 2–3 weeks). The re-crystallization areas respond differently to stylus pressure than those which have not recrystallized, and the cell and its walls receive a distorted form.

By virtue of such defects, plate or cylinder waste is typically between 2–10% depending on the print's desired quality and in view of the high costs of gravure cylinders, this fact poses a serious financial problem in this industry.

One technique of quality control of gravure cylinders involves the formation of three parallel reference test lines with depth/size corresponding to 5, 50 and 100 dot percentage prior to the engraving of gravure cells and also at the end of the engraving process. The two sets of lines are compared and the extent of discrepancy, if any, is proportional to the error extent in the process of formation of the gravure cells. The method has an inherent shortcoming in that the cylinder's quality can only be evaluated post factum at a stage in which nothing can be done anymore to correct the defects in the already formed cells. Accordingly, in case the variation exceeds a certain allowed threshold, depending on the exact quality of the printed job, the cylinder should be discarded and a new one has to be engraved.

By an alternative approach, the size of gravure cells is measured manually by auxiliary means such as, for example, Dotcheck™ (Twentse Graveer Industrie B. V., Entschede, The Netherlands). However, such cell measuring systems operate off-line and cannot be applied during the engraving process. Additionally, such a manual process depends on personal skills, and as such, is susceptible to inaccuracies depending on the individual who conducts the inspection.

It is the object of the present invention to provide an automated printing plate and printing cylinder inspection method and system, capable of inspecting offset plate and gravure cylinders and detecting defects of the kind specified during or after the manufacturing process thereof.

It is a further object of the present invention to provide such method and system in which the inspection is performed in a reliable and reproducible fashion, which does not interfere in the manufacturing process, and which is essentially independent on human skills.

GENERAL DESCRIPTION OF THE INVENTION

The present invention provides a novel method for inspection of a surface of a printing medium, e.g. a printing plate or gravure cylinder. In accordance with the present invention an image of the printing surface is optically acquired, a real digital representation of the surface is produced and a computer then determines whether the real digital representation has a defect or not and provides an output signal in the case of a defect, and at times also an indication of the type of defect. In case of gravure cylinders, the output signal which signifies a type and extent of defect in already prepared cells may serve for feeding compensating instructions in the preparation of successive cells to give rise to the formation of gravure cells which will eventually result in correct print on a page.

In accordance with the present invention two embodiments are provided, one which is referred to herein as "reference embodiment" and the other which is referred to herein as "non reference embodiment". The nature of these embodiments will be clarified in the following description.

In accordance with the present invention there is provided a method for inspecting a surface of a printing medium, the method comprising the steps of:

(a) acquiring an image of the surface or a portion thereof, digitizing the acquired image whereby a digitized real representation of the surface or portion is obtained;

(b) for each of said digitized real representation performing either or both of the following steps (b)(i) and (b)(ii):

(i) comparing said digitized real representation with a digital reference representation, said reference representation being a virtual digital fault-free representation of said surface or portion thereof, (ii) determining whether said real digitized representation is in compliance with stipulations of a set of rules which define the characteristics of a fault-free digital representation of said surface or portion; and (c) providing either a correct indication output signal where there is a match between said real digitized representation with said reference digital representation in the case of (b)(i) or compliance with said rules in the case of (b)(ii), or fault indication output signal where there is a mismatch in the case of (b)(i) or incompliance in the case of (b)(ii).

The present invention also provides a system for detecting whether a surface of a printing medium contains defects which may affect the quality of the print and provide an indication in the case of such a defect. In accordance with one embodiment the system comprises:

(a) means for acquiring an image of the surface or a portion thereof and converting it into a digital representation, being a digital real representation of said surface or portion;

(b) means for acquiring a reference representation, which is a virtual digital fault-free representation of said surface or portion; and (c) means for comparing between said real and said reference representation and for providing an output signal in the case of either a mismatch or a match.

A system in accordance with a second embodiment of the present invention, comprising:

(a) means for acquiring an image of the surface or a portion thereof and converting it into a digital representation, being a digital real representation of said surface or portion;

(b) means for determining whether said real digital representation is in compliance with stipulations of a set of rules defining the characteristics of fault-free digital representation of said surface or portion; and (c) providing an output signal either where a real representation is in compliance with said rules or in the case where said digital representation is incompliance with said rules.

The real representation is produced from the acquired image on the basis of a physical entity, i.e. the printing surface of the printing medium. Against this, the reference representation is a virtual representation produced inside a computer and which has no counterpart in a physical entity, and is the expected real representation in case there are no faults on the printing surface.

The comparison between the real and the reference representation can be performed on the entire surface or can be performed on consecutive portions of the surface one after the other. The size of such surface portions depends on various considerations such as, for example, the desired accuracy of the comparison; the way in which said reference and real representations are compared, namely the common denominator to which one or both are brought so as to allow their comparison stipulated in step (b)(i) or the type of representation into which said digital representation is brought so as to determine its compliance with the set of rules stipulated in step (b)(ii). Typically the size of the surface portions will be equal to a single frame of the image acquiring means and will be sufficient so as to be able to encompass within at least one gravure cell in the case of a gravure cylinder, or a least one screen cell in the case of offset plates, etc.

The printing medium may be a gravure cylinder or an offset plate.

As noted above, the present invention can be carried out by either or both of the "reference embodiment" and the "non reference embodiment". In accordance with the reference embodiment, the real representation is compared to a reference representation, which is generated by the computer and is the expected image in the case of no faults in the inspected surface. A computer then determines the correspondence between the virtual and the real representation, i.e. whether the two images match and an output signal is provided indicating either match or mismatch as the case may be.

"Mismatch" on the one hand and "match" on the other hand, should be understood as defining relative qualities. A match does not necessarily mean a 100% identity. Depending on the quality of print, a discrepancy threshold can be defined and in case the discrepancy exceeds that threshold, an output signal indicating a mismatch is given whereas if the discrepancy is below this threshold, the images are considered as matching. The threshold is obviously relative and depends, for example, on the desired print quality, the accuracy of the system which serves for the preparation of the offset plates or gravure cylinders and others parameters. Thus, in case of high quality print, the threshold is as a rule low, i.e. the allowed discrepancy will be low, whereas in the case of a low quality print, a high threshold and thus a higher degree of mismatch may be tolerated. For example, in case of scratch type defects low discrepancy signifies a low number of scratches or scratches of an insignificant nature which are hardly or not at all visible on the eventual print job.

The data which is used to construct the digital reference representation may be, for example, the data which was used in order to construct the surface of the printing medium in its manufacturing process: e.g. data used for the preparation of the separation film which is used later for the preparation of the offset plate; data used for direct offset plate exposure; data which provides the set of instructions used to drive the stylus in the helioklischograph; etc. The reference representation may also be derived from data which was generated by scanning a film or picture which served as a base for the manufacture of the plate or cylinder.

The printing surface on a gravure cylinder is prepared, by some printing techniques, directly on the basis of an image which is to be printed, namely, a picture is scanned and engraving instructions are sent directly from the scanning head to the helioklischograph. These instructions can be used to construct the digital reference representation which is then compared to the scanned engraved real image.

A specific example of the reference embodiment of the invention is its application in the preparation of gravure cylinders. Gravure cylinders are prepared by either chemically etching the surface of a cylinder after it has been exposed to a laser or by the use of a pyramid shaped diamond stylus in a helioklischograph. In accordance with one aspect of the present invention, an optical scanner is added to a gravure cylinder engraving apparatus at a distance that enables proper surface image capture of at least one cell immediately after its formation. An image of each gravure cell may then be recorded and processed by the use of suitable image processing techniques generally known per se. The recorded real image is digitized and the digitized representation is then compared to a reference representation computed on the basis of the instructions used to drive the stylus head for the gravure cell formation. Obviously, the computation may be performed by a different processor than the one performing the comparison, in which case the reference representation is fed to a comparing computer for comparison. In case of a discrepancy, e.g. where the gravure cell is shallower than it should have been, correction instructions may be fed back to the stylus or laser head driver resulting in the production of a proper successive gravure cell. Furthermore, defects in the stylus itself, such as chopped tip, stylus ribs defect, etc. may be compensated by slightly increasing the force in which the stylus hits the surface consequent slight increase in the gravure cell's depth. As a result, the gravure cells will eventually have the correct volume and thus during printing will contain the correct mount of ink.

It will no doubt be appreciated that the above on-line compensating procedure offers a very important and significant advantage over the manually measuring auxiliary means hitherto known, as it provides for a real-time correction or compensation feedback mechanisms in the manufacturing process of a gravure cylinder. Thus, the set of instructions for the manufacturing of a typical gravure cell may be modified so as to compensate defects in already prepared cells giving rise to the formation of a gravure cell which will eventually result in the correct print on page.

In accordance with the "non reference embodiment" the digital real representation is analyzed to determine whether it is in compliance with stipulations of a set of rules characterizing a fault-free digital image. The set of rules may be such which are "context independent", namely, rules which apply to an image irrespective of its context, or may be "context dependent", rules which apply only for the construction of a specific image.

In the case of gravure cells, context independent rules can typically be divided into three groups: rules which relate to cell boundaries, hereinafter "boundary rules"; rules which relate to the internal structure of a cell, hereinafter "intra-cell rules"; and rules which define the surface structure in between cells, hereinafter "inter-cell rules". Boundary rules of gravure cells stipulate, for example, that a cell should have continuous walls and furthermore, in the case of cells prepared by the use of a helioklischograph, that the cells should have an overall diamond or other predetermined shape. There are as a rule, only a limited number of different styluses which are used for engraving and accordingly the relations between the walls are selected from a limited ensemble of allowed relations. A typical example for such a relation is the angle formed between adjacent walls of a diamond.

Furthermore, in cases where the stylus of an helioklischograph is diamond shaped, a defect free gravure cell should have an internal pyramidal shape. The intra-cell rules in such a case dictate that a cell should have a pyramidal structure. In the case of a chopped tip or in the case of rib wearing, the internal structure of a gravure cell will be inconsistent with one or more of the rules, i.e. defective.

Regarding inter-cell rules, in the case of a gravure cylinder, such rules stipulate that all images on the surface should have a diamond or other predetermined shape and that there should be a smooth and continuous surface between cells. An impression found between cells thus denotes a defect.

Context dependent rules include, for example, the division of a page between non-printed margins and printed areas, distances between cells in a gravure cylinder and distances between screen cells in an offset plate, rules which apply to the location of text, to shape of letters, etc. Some context dependent rules can be determined by acquiring an entire element of printing medium, e.g. an entire page or column, and then deducing the context dependent rules from the scanned element. In case of offset plates, context dependent rules may, for example, be those applied to text incorporated in the printing plate.

The information on the discrepancy between the digitized real and reference representations or the extent of inconsistency with the rules may be stored and may provide information on the basis of which defect-compensating instruction may be generated for the next, printing stage. For example, if a segment of a gravure cylinder contains gravure cells or a part thereof which are shallower or deeper than they should have been, or are defective in any other way whereupon their volume is less or more than it should have been, proper instructions may be fed, for example, for the regulation of the quantity of the ink or the amount of pigments in the ink, that is transferred to the press.

It should also be appreciated that by one aspect of the invention the said reference and non-reference mode of operations may be combined. For example, considering a gravure cylinder printing medium, a typical combined mode of operation includes the application of the reference mode with respect to complete cells, whereas the non-reference mode of operation involves the application of the boundary rules and intra cell rules to cells' portions and the application of inter cell rules so as to detect defects appearing between cells. Such a combined mode of operation typically give rise to improved inspection results.

DETAILED DESCRIPTION OF A SPECIFIC EMBODIMENT

Before describing some embodiments of the present invention in detail, two specific, non-limiting examples of a system useful in the performance of the method of the present invention will be described, one useful in the manufacture of offset plates and the other in the manufacture of gravure cylinders.

Figure 1:
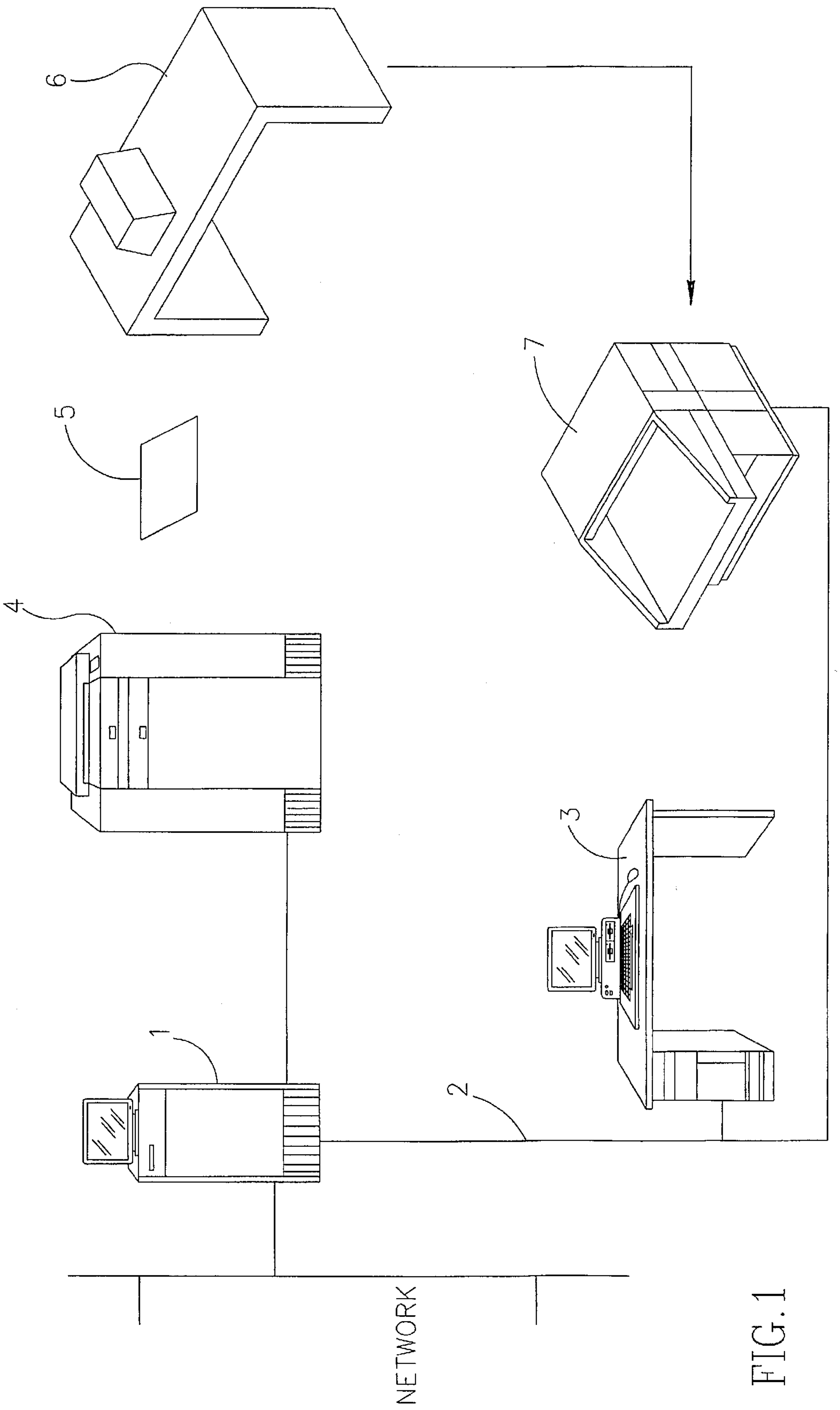
FIG. 1 is an illustration of an offset plate inspection system in accordance with an embodiment of the invention.

Attention is directed to FIG. 1 showing a schematic illustration of a system useful in an embodiment of the invention which serves for the manufacturing of offset plates. The system comprises a computer 1 such as micro-Whisper/I™ computer, commercially available from Scitex Corporation, Herzlia, Israel, interlinked by means of communication network 2 to workstation 3 such as a Prisma™ or Star PS™, commercially available from Scitex Corporation, Herzlia, Israel. Computer 1 is also linked to image setter 4 such as Dolev 200™ commercially available from Scitex Corporation, Herzlia, Israel.

In operation, a reference digital representation of an imposed printing plate, which is generated in workstation 3 is stored in the memory of computer 1. The latter is used to drive the image setter 4 by incorporating suitable printing instructions giving rise to the formation of color separation films 5 (of which only one is schematically shown). The latter is then fed into a contact frame or step and repeat machine 6, in which the printing plate is exposed. Image acquisition means 7 such as Monoscan™ CCD scanner commercially available from Scitex Corporation, Herzlia, Israel, which, as shown, is also linked to computer 1, allows the generation of a real representation by scanning an already prepared plate, and feeding of the scanned representation to the memory of workstation 3, for the purpose of comparison with the reference representation as will be explained in further detail below. It should be noted that the reference representation may be in a form of a digital file generated in a computer or a digital file formed on the basis of external dam, e.g. data obtained by scanning an already prepared plate.

Figure 2:
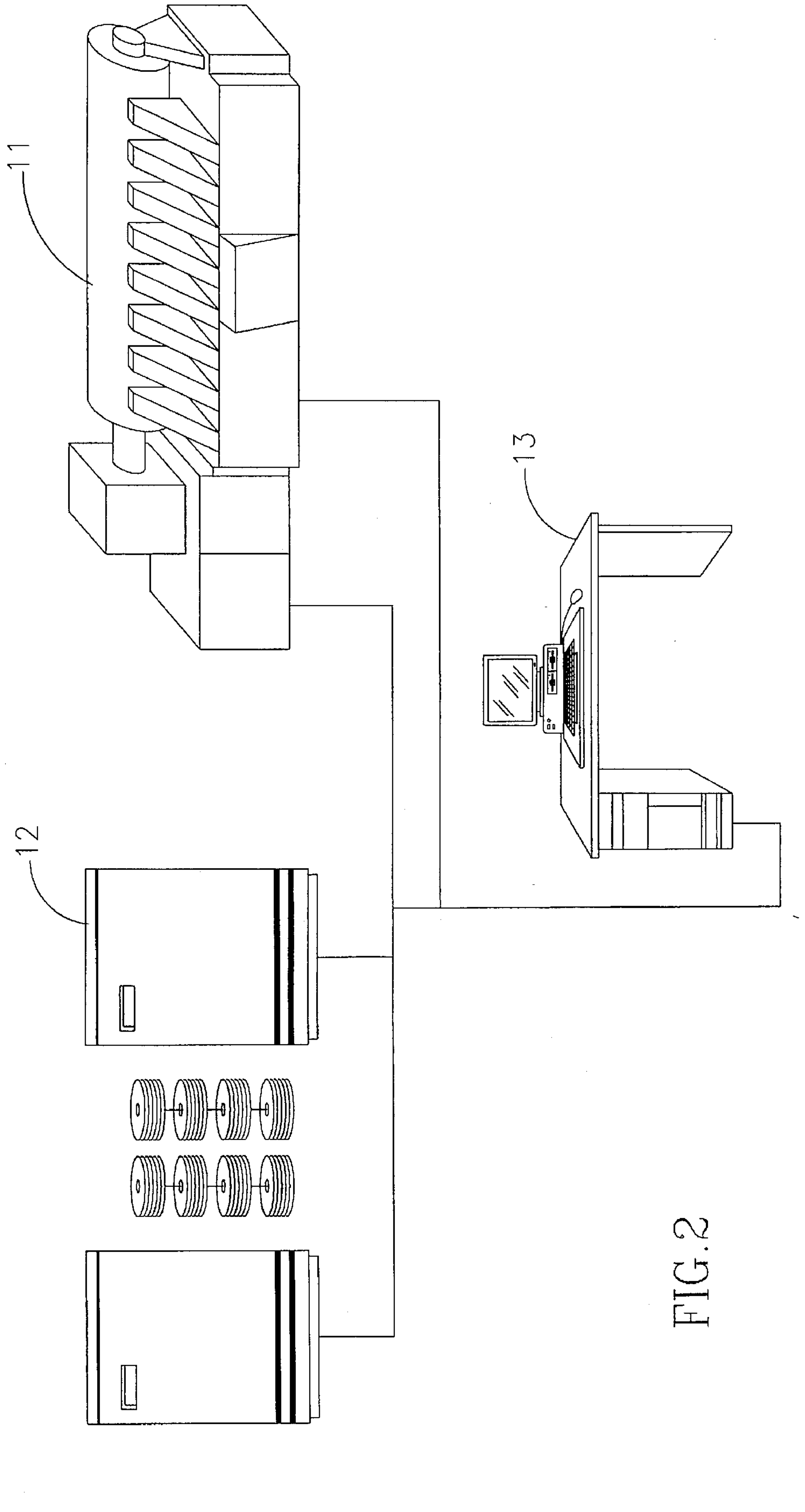
FIG. 2 is an illustration of an on-line gravure cylinder inspection system in accordance with an embodiment of the invention.

Attention is now directed to FIG. 2 which illustrates a system useful in the manufacture of gravure cylinders in accordance with another embodiment of the invention. The engraving of the cylinder is typically performed by an helioklischograph apparatus 11 commercially available, for example, from Linotype-Hell GmbH, Eschborn, Germany. Digital data from which the cylinder is engraved is provided by an helioklischograph driver 12 (such as Logo, commercially available from Scitex Corporation, Herzlia) and is generated in workstation 13. The system of the invention, heliokischograph 11 has an image acquiring means (not shown), the function of which will be elucidated further below.

It should be noted that the architecture and operation of a gravure cylinder or offset plate manufacturing system (FIGS. 1 and 2) is known per se and its detailed description of its component and manner of operation goes beyond the present writing. Accordingly only a brief description is provided herein.

Figure 3:
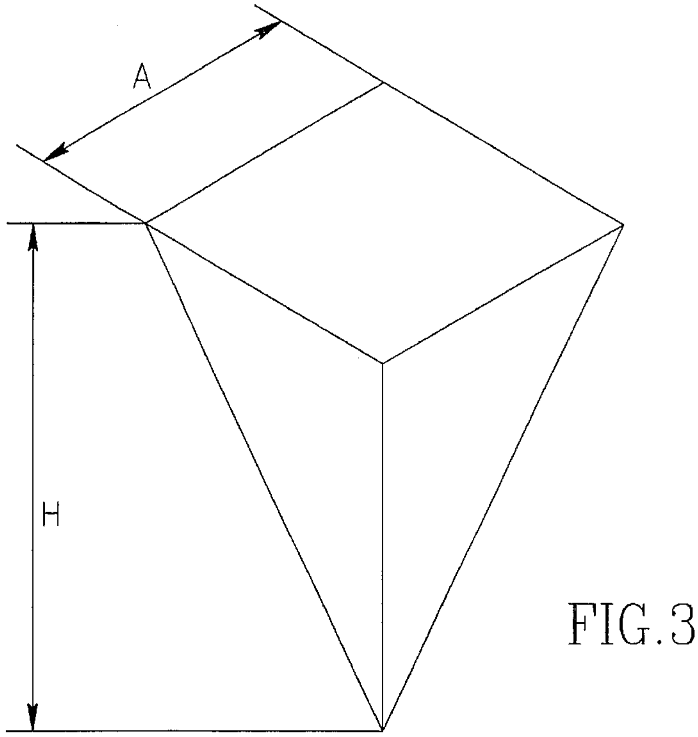
FIG. 3 is an axonometric view of a typical diamond stylus used for the manufacturing of gravure cells.

FIG. 3 shows an axonometric view of a typical pyramid-shaped diamond stylus which is forced into the copper cylinder for the formation of gravure cells in an helioklischograph. The pyramid angle of the diamond are typically between 120°–140°. (The relation between the diagonals of the pyramid cross-section in a surface normal to the diamond axis defines usually the printing ink/screen angle).

Figure 4:
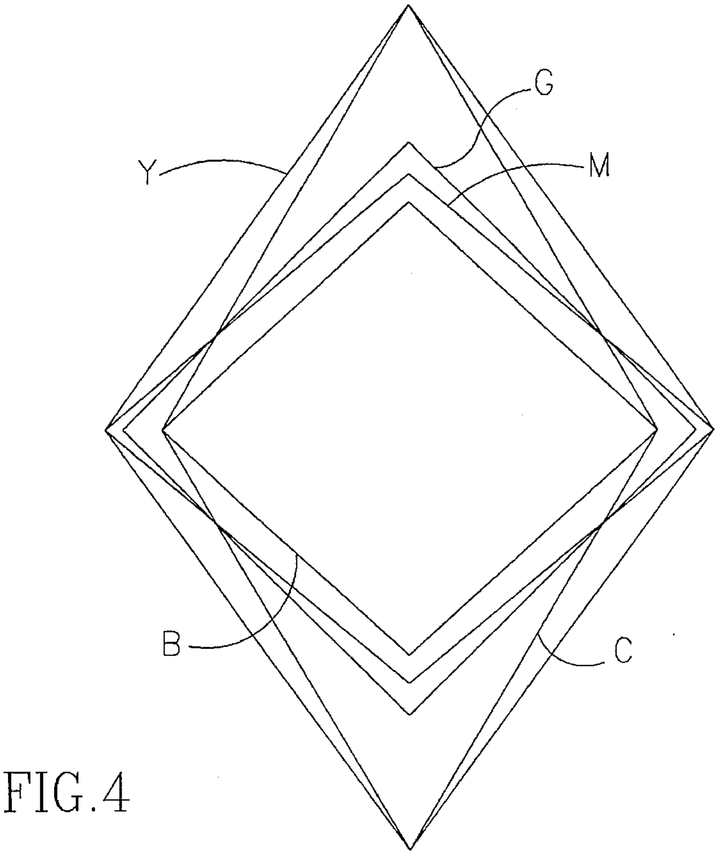
FIG. 4 is a schematic illustration of a set of typical superimposed gravure cells for different inks as they would be engraved, each on a separate gravure cylinder.
Figure 5A:
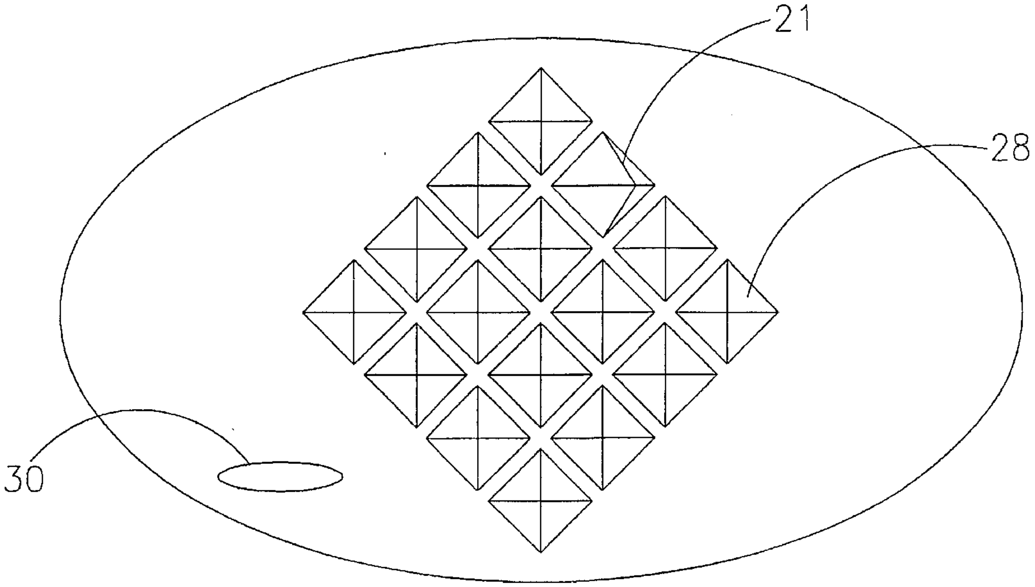
FIG. 5 is a schematic upper view of a gravure cylinder surface depicting examples of defects in a gravure cell cylinder (Figs. (a) and (b)); and a schematic upper view of an offset plate surface depicting examples of defects in printing elements (Figs. (c) and (d))
Figure 5B:
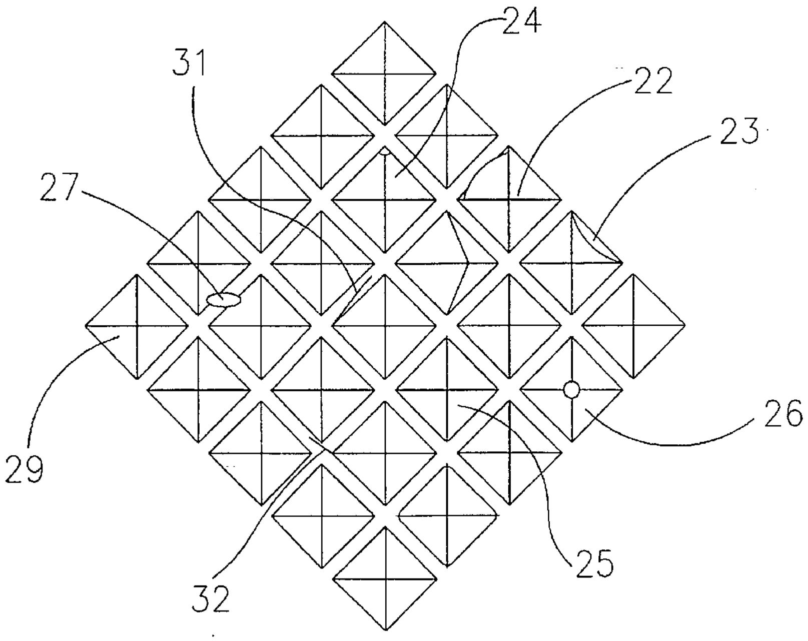
Figure 5C:
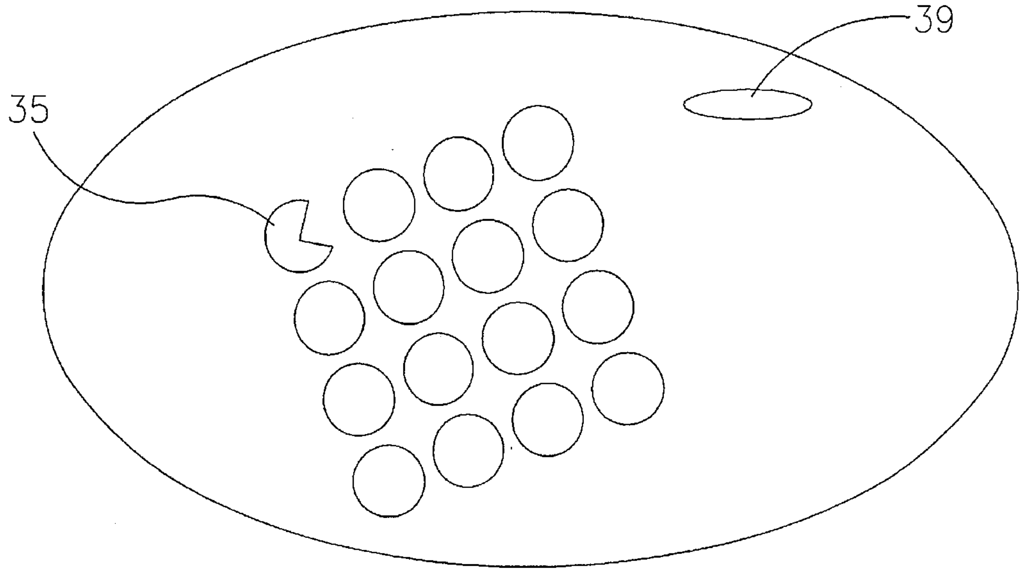
Figure 5D:
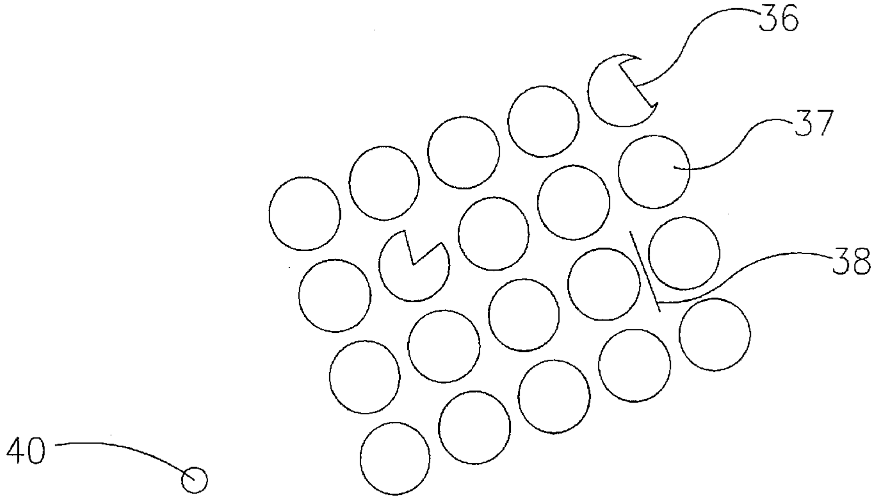

Gravure cylinders for printing of different colors (usually 4 colors are printed—cyan, yellow, magenta and black) have different angles between the diagonals of their gravure cells. FIG. 4 is a schematic illustration of a set of typical several superimposed gravure cells for different inks as they would be engraved, each on a separate gravure cylinder. It should be noted that in reality each type of gravure cell is engraved on a different cylinder, and that their superimposition has been made only for illustrative purposes. Thus, each printed color has a characteristic diagonals relation, i.e. C—cyan; Y—yellow; M—magenta; B—black.

Reference is now made to FIG. 5 which is a schematic representation of some typical gravure cell defects (FIGS. 5(*a*) and 5(*b*)) or offset plate defects (FIGS. 5(*c*) and 5(*d*)). Defective gravure cells are, for example 21 of FIG. 5(*a*), and cells 22, 23, 24, 25, 26 and 27 in FIG. 5(*b*) which may be compared to standard, defect free cells 28 and 29 in FIGS. 5(*a*) and 5(*b*), respectively. In addition to these defects in imaged area, there may be various defects in non-imaged area such as pit 30 in FIG. 5(*a*) or scratches in between the cells such as 31 and 32 in FIG. 5(*b*).

Defects with a similar effect also occur in offset plates, examples being printing elements defects 35 in FIG. 5(*c*) and 36 and 37 in FIG. 5(*b*); imaged area errors outside the elements such as scratch 38 as well as non-imaged area errors such as spots 39 and 40 in FIGS. 5(*c*) and 5(*d*), respectively.

The above exemplified defects are all context independent errors and in addition to those there may also be context dependent errors such as, for example, gravure cells or offset screen cells formed in an area intended to be image free, e.g., in the margins, or defects in the shape of letters incorporated in the printing offset plate.

Figure 6:
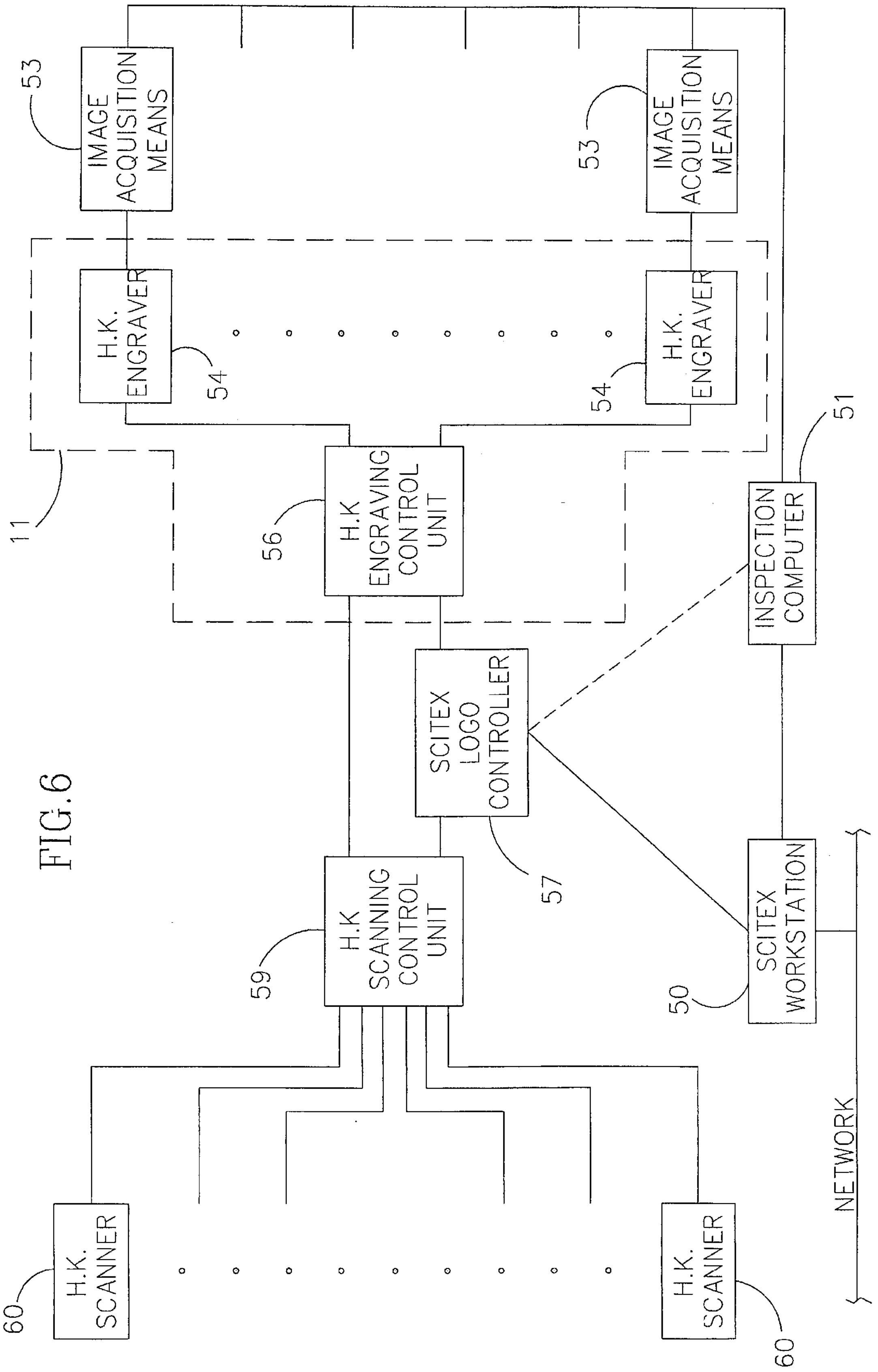
FIG. 6 is a block diagram of various hardware components serving for the inspection of gravure cylinders in a system of FIG. 2.

Attention is directed to FIG. 6 showing a block diagram of various hardware components utilized in a typical gravure cylinder inspection system according to one embodiment of the invention (see also FIG. 2).

Workstation 50 (such as, for example, workstation 13 referred to in FIG. 2) is linked to computer 51 being for example, SIS 21 commercially available from Forth Computers GmbH, Munich, Germany. The latter is equipped with dedicated hardware Max Video 200 (not shown) available from DataCube Inc., Danvers, Mass., USA. Such a hardware gives computer 51 the capability of accelerated computation required for performing the image processing steps (for further details see below). Computer 51 is in its turn linked to a plurality of image capturing means 53 being each rigidly coupled to the carriage of the engraving heads 54, which together with engraving control unit 56 form part of an engraver such, as for example, a helioklischograph engraver 11 as shown in FIG. 2. The image capturing means comprise, for example, a black and white miniature CCD camera (e.g. Model XC-77 available from Sony, Japan), equipped with a lens with sufficient depth of field to keep both the surface and the bottom of the gravure cells in focus. The field of view of the camera is typically, 2×2 mm. Rather than a CCD, the image acquisition means may also be another device capable of capturing an image of surface elements of a printing surface of a printing medium. Thus, for example, one- or two-dimensional scanners, e.g., a laser scanner.

The light source is preferably a structural light illumination which enhances surface features. An example is a linear optical fiber-based slit guide which supplies homogeneous lighting to the field of view so as to form background illumination which will result in different reflection intensities from different surface angles. Such background illumination techniques are known per se and described for example in sections 4.4, 5.6, 10.6 and 10.8 of Batchelor, B. G., Automated Visual Inspection, IFS Publishing Inc., 1985. The camera, lens and light source will be at times referred to herein collectively as "optical assembly". The image acquisition means generate a real image, (see below for further details), being fed via communication link 55 to inspection computer 51. Engraving control unit 56 is connected to the plurality of engraver heads 54 and also to system Logo controller 57. The manner of control of the operation of the engraver by unit 56 and controller 57 is generally known per se and the description thereof goes beyond the present writing.

An opaque fill (also known in the literature as bromide) may be scanned by a scanner 60 and fed to a scanning control unit 59 which in turn converts the scanned image into a set of instruction adapted to drive the stylus of engraving head 54. The scanned image in this case also serves for the construction of a digital reference representation. Alternatively, the digital reference representation, may be stored in or generated by workstation 50. Thus, the reference representation fed to computer 51 may be the digital representation stored in workstation 50, or alternatively, the digital representation stored in a logo controller 12, the latter, as mentioned above, being constructed by scanning the bromide or fill.

Figure 7:
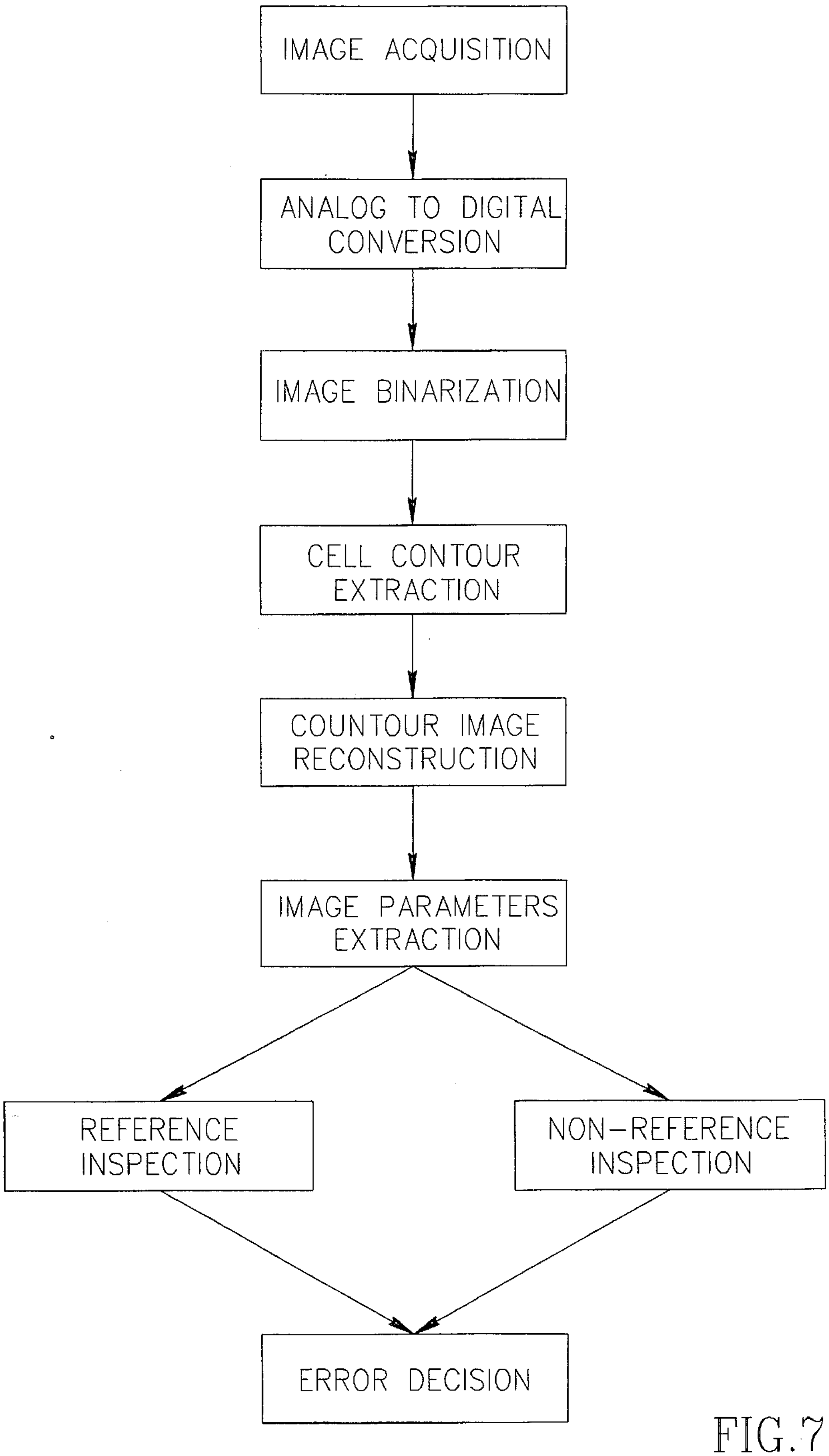
FIG. 7 is a flow chart of the operating steps required to perform an offset plate or gravure cylinder inspection according to one embodiment of the invention.

Attention is now being directed to FIG. 7 showing a flow chart of the operating steps of an inspection method according to one aspect of the invention, performed, for example, in the inspection computer 51 (see FIG. 6) which, in accordance with one embodiment, is fed with a reference representation (or rules in the case of said non-reference embodiment) from workstation 50 and with a real representation, via image acquiring means 53 (being in this example a CCD camera). The explanation in the following will be focused on a specific, non-limiting embodiment of the method for gravure cylinder inspection although it will no doubt be appreciated that by obvious modifications the method is applicable to other embodiments for gravure cell inspection as well as to embodiments of the invention concerned with the inspection of printing plates, e.g. offset plates, utilizing a system such as that shown in FIG. 1.

At a fast, image acquisition step, the CCD camera transmits a real representation the boundaries of which are being defined by the camera's field of view (FOV). Typically, the FOV is such so that the image includes at least one full gravure cell. Responsive to said image acquisition step, an analog to digital conversion step is performed by the camera electronics, which may involve the use of a known per se black level equalization on a line-by-line basis, in order to compensate for image reflection fluctuations. A bit map consisting of grey level pixels is thus constructed. The said optical assembly is so devised that different planes, i.e. cylinder's upper surface, cell's side walls, cell's bottom, etc., will reflect differently in the direction of the image acquisition means, yielding different grey level values. This real digital representation is then subjected to image binarization phase by which a frame grabber, forming part of said dedicated hardware of the inspection computer 51, performs the binarization phase of an oncoming representation. The binarization process transforms the grey level representation to a one-bit black-white image: a pixel containing "0" represents non-reflecting areas whilst a pixel containing "1" represents reflecting areas; or vice versa.

The threshold value which determines whether a pixel is assigned with the value "0" or "1" is dynamic and may be calculated by known algorithms such as on a line-by-line basis using an on-line histogram search for reflecting and non-reflecting pixel cluster value (such histogram search is described, for example, pages 82–152 of Rosenfeld, A., and Kak, A., Digital Picture Processing, Academic Press Inc.

The data is then subjected to edge/line segment extraction by which the binary stream which was subjected to the previous binarization phase undergoes an additional stage where "0" to "1" and "1" to "0" transitions are detected and their location in the representation is stored. Such a representation may be, for example, in a form of a so-called "skeleton map" by which the bit map (which was constructed in the previous binarization step) is represented in terms of continuous lines and curves referred to as "segments", e.g. by following the known "Canny edge detection algorithm".

The skeleton map representation, which is also known as "medial axis transform", is described in the specified pages 82–152 of Rosenfeld, A., and Kak, A., Digital Picture Processing, Academic Press Inc., or in pages 76–194 of Ballard, D. H. and Brown, C. M., Computer Vision, Prentice Hall, Inc. 1982.

The skeleton map produced by the edge/line segment extraction undergoes a successive edge/line clustering and sorting calculation by which an "edge table" is produced in which the segments are classified into three categories: (i) segments forming part of cell contour or boundary, (ii) segments forming pan of intra-cell surface and (iii) segments forming part of inter-cell surface. The classification of the segments into the suitable category is performed, for example, by following an Heuristic approach based on input data and assumptions. Thus, for example, the location of the camera's FOV center once the stylus terminates the formation of gravure cells may provide a clue on where to locate the cell boundaries. The segments which are estimated to be the cell contours are suitably classified as boundary segments. The classification of the segments into this boundary category helps to classify those belonging to the intra-cell and inter-cell categories.

The edge table data obtained in the previous step undergoes a contour parameter extraction in which the geometrical properties of each cell contour is extracted. Such geometrical properties include, for example, the following parameters: planar location of cell center, cell depth, cell circumference, cell area, skew/eccentricity of the cell, vertex or border locations and cell orientation. This is performed by utilizing known graph algorithm techniques.

The parametric representation of the real image obtained in the cell contour parameter extraction step is in an adequate form for both a reference inspection and a non-reference inspection mode of operations. In case of reference inspection, parameters of the real image are compared one by one to parameters of theoretical cells forming part of the reference representation. Each parameter has its own user-defined threshold and in case the variances in one or more of the comparisons exceeds its respective threshold, the system issues a predetermined report, stating for example the defect type, its severity and location. As already mentioned above the variance may also serve for the generation of compensating instructions for the stylus of the engraver head or to the ink-key zone control unit of the printing machine. For the purpose of comparison between the real and the reference representation, the latter should also be transformed into the same parametric representation.

The reference representation typically consists of two-dimensional pixel array having each a certain grey level value. The reference representation is typically the representation on the basis of which the printing medium is prepared. The location of a pixel in the array provides the X-Y coordinate whereas the grey level value corresponds to the instructions given to the engraver head in order to control the cell's depth, the penetration depth of the stylus in the case of the heliklischograph. The conversion from such a pixel representation to instructions for the helioklischograph may be performed, as known, by the Logo driver. These known X-Y and depth values are then compared, in the reference inspection mode, with the planar location of cell center and cell center of the real representation obtained in the cell contour parameter extraction step. It should be noted that rather than using the cell's depth parameter, the cell area parameter or other parameters such as location of cell borders, may also be used in the reference inspection mode.

Alternatively, the reverse procedure may be carried out, namely the conversion of the real image into a two dimensional array of grey level pixels and the comparison may then be performed in this domain.

The aforementioned procedure for comparison between real and reference representation in the case of gravure cylinders applies, mutatis mutandis, also to other printing media, e.g. offset plates. It should be noted in this connection that in the case of offset plates the screen cell area parameter is utilized as a grey level control. When inspecting offset plates in accordance with the reference embodiment of the invention, the screen cell area is checked for correspondence with the grey level and/or bit map representation at a particular pixel.

In the non-reference inspection mode of operation, the real representation, in its parametric form, is tested for its compliance with a set of rules defining inter-cell, intra-cell and boundary parameters of defect-free cells. Not every surface segment is necessarily classified into one of these three groups. Examples are intra-cell defects not on the cell ribs, e.g. a scratch on one of the internal surfaces of the cell, or the like. In addition, certain types of defects may classified immediately, without comparing them to a set of rules, such as, for example, a group of lines having all the same orientation and being close to one another is a characteristic of an abrasion type defect. In order to characterize such defects the real representation may undergo through an optional, preliminary defect classification stage in which such defects are characterized and classified in terms of density, position, orientation, etc.

In the non-reference, parametric evaluation step, the parameters which characterize the various segments, are tested for compliance with certain rules. For example, one rule may dictate that contour forming segments should be straight and continuous and any deviation therefrom signifies a defect. Furthermore, in this step the input from the defect classification is evaluated to determine the type and severity of the defect. Thus, for example, in case of plurality of parallel lines, close to one another, such an input will be classified as abrasion. In addition, in this step, the severity of all defects is determined by comparing the degree to a predetermined threshold.

It should be noted that the threshold which distinguishes between tolerated defects and non tolerated ones, namely such regarding which an indication of defect will be given, is not a universal threshold but rather a specific threshold for each tested parameter.

It should be realized that while in the embodiment shown in FIG. 7, inspection stage is a single discrete stage, the non-reference inspection may be divided into a plurality of steps applied within various stages of processing. Thus, for example, after determining the cell contour parameters, the rules which apply to these contours may be immediately applied and thereby immediately detecting defects arising from the stylus head, e.g. any deviation from linearity, above threshold, of either cell external contours or of cell ribs may be immediately classified as a defect. As another example, if dew to faults in the stylus head or in the head driver as a result of which the stylus is not forced into the copper cylinder, with the consequence that a gravure cylinder is not formed, this may be detected by applying the appropriate rules at the edge/line cluster and son stage.

In the embodiment described above a threshold filter was applied only at the inspection stage. It may however be useful at times to apply a threshold filter also during the image acquisition and subsequent initial image processing steps, for filtering out various small and insignificant surface features.

It should be realized by those versed in the art that the aforesaid embodiment is given merely by way of example. Thus, it is appreciated that an inspection method according to the invention is not bound by the aforesaid steps and the method of the invention can be carried out in any form by which the real time representation and the reference representation are brought into as a common denominator. In other words, various image analysis steps may be omitted or other added depending on the particular application, the desired inspection quality, and other factors. Thus, for example, a comparison between the real representation and the reference representation may be performed between corresponding skeleton maps or between corresponding "edge table".

The comparison may also be performed between corresponding bit maps of real and reference representations provided however, that they are brought into a comparable form in terms of resolution. Thus, for example in cases of offset plate scanner, the offset plate may be scanned by a monochrome CCD scanner such as Monoscan™, commercially available from Scitex Corporation, Herzlia, Israel, resulting in a reference representation, which in cases of identical resolution may be compared, pixel by pixel, to the real representation. Such a reference representation may be generated or provided by known systems, e.g. Star PS/I™ and micro-Whisper/I™ imposition workstation, commercially available from Scitex Corporation, Herzlia, Israel.

When the scanning resolution of the real representation is different than that of the corresponding reference representation, they should, as already mentioned above, be brought into a comparable form, which may be achieved, for example, by the known spatial transformation method such as that described in U.S. Pat. No. 5,296,235 and both assigned to Scitex Corporation Ltd., Herzlia, Israel.

In general, it may be appreciated, that any type of representation in which the real and the reference representation may be compared is in principle applicable in accordance with the present invention.

We claim:

1. A method for preprinting inspection of a surface of a printing medium, the method comprising the steps of:

(a) acquiring an image of the surface or a portion thereof, digitizing the acquired image whereby a digitized real representation of the surface or portion thereof is obtained;

(b) determining whether said digitized real representation is in compliance with stipulations of a set of rules which define the characteristics of said virtual digital fault-free representation of said surface or portion thereof; and (c) providing either a correct indication output signal where there is compliance with said rules, or fault indication output signal Where there is incompliance with said rules wherein said set of rules compromising context independent rules which apply to said image irrespective of its context, said context independent rules are selected from the group consisting of boundary rules for each gravure cell of the printing medium, rules which relate to the internal structure of each said plurality of gravure cells of the printing medium, and rules which define the surface structure between two adjacent gravure cells of the printing medium.

2. A method according to claim 1, wherein the printing medium is a gravure cylinder or an offset plate.

3. A method according to claim 1 wherein said step of comparing comprises a preliminary substep by which said digital reference and digitized real representations are brought into a comparable representation.

4. A method according to claim 1 further comprising the step of determining whether a deviation from said stipulations of said set of rules exceeds a given threshold giving rise to a fault indication.

5. A method according to claim 4 further comprising providing instructions to at least one ink control unit of a printing press in case of said fault indication.

6. A method according to claim 4 wherein the printing medium is a gravure cylinder, said method further comprising employing a selected one from the group consisting of an engraver head, a laser and chemical etching to form cells of said gravure cylinder, said fault indication being used for providing compensating instructions to said selected one to compensate for said deviation or discrepancy.

7. A method according to claim 1 further comprising forming said digital reference representation from data employed to construct the surface of the printing medium in its manufacturing process.

8. A method according to claim 7 wherein the printing medium is an offset plate and, said method further comprising employing said data for preparing a color separation film subsequently employed for producing said offset plate, or for directly exposing said offset plate.

9. A method according to claim 7 wherein the printing medium is a gravure cylinder, said method further comprising employing said data for providing a set of instructions for driving an engraver head in a helioklischograph.

10. A method according to claim 1 further comprising employing a scanner for producing said reference representation from one of the group consisting of a plate, a film, and a picture which formed a basis for manufacturing a plate or a cylinder.

11. A method according to claim 1 wherein the printing medium is a gravure cylinder further comprising employing a scanner for optically acquiring said image at close proximity to an engraver head of a gravure cylinder preparation apparatus.

12. A method according to claim 1 wherein said digitized real representation comprises a two-dimensional grey level pixel array and said method further comprises (a1) subjecting the grey level pixel array to an image binarization in which the grey level representation is transformed to a one-bit black-white representation;

(a2) subjecting the binarized image to an edge/line segment extraction in which "0" to "1" and "1" to "0" transitions are detected and forming a skeleton map in accordance with said segment extraction said skeleton map comprising edge/line clusters;

(a3) sorting said edge/line clusters into three categories; (i) segments forming part of said cell contour or boundary; (ii) segments forming part of intra-cell surface; and (iii) segments forming part of inter-cell surface;

(a4) extracting the geometrical properties of the cell contours from the results obtained in step (a3).

13. A method according to claim 1 wherein said set of rules comprises context dependent rules which apply to said image in accordance with its context.

14. A system for pre printing inspection of a surface of a printing medium comprising:

(a) means for acquiring an image of the surface of said printing medium or a portion thereof and converting said image into a digital representation, said digital representation being a digital real representation of said surface or portion thereof;

(b) means for determining whether said digital real representation is in compliance with stipulations of a set of rules defining the characteristics of fault-free digital representation of said surface or said portion; and (c) means for providing a first output signal where said digital real representation is in compliance with said rules and a second output signal where said digital representation is in incompliance with said rules wherein said set of rules comprising context independent rules which apply to said image irrespective of its context, said context independent rules are selected from the group consisting of boundary rules for each gravure cell of the printing medium, rules which relate to the internal structure of each of said plurality of gravure cells of the printing medium and rules which define the surface structure between two adjacent gravure cells of the printing medium.

15. A system according to claim 14 wherein said image acquisition means is selected from the group consisting of a CCD, a video camera, a laser range finder, and one or two dimensional signal scanners.

* * * * *